B. F. HOSLEY.
NON-SKID CHAIN FASTENING MEANS.
APPLICATION FILED JAN. 24, 1919.

1,318,081.

Patented Oct. 7, 1919.
2 SHEETS—SHEET 1.

INVENTOR
Bert F Hosley

B. F. HOSLEY.
NON-SKID CHAIN FASTENING MEANS.
APPLICATION FILED JAN. 24, 1919.

1,318,081.

Patented Oct. 7, 1919.
2 SHEETS—SHEET 2.

INVENTOR
Bert F Hosley

UNITED STATES PATENT OFFICE.

BERT F. HOSLEY, OF SYRACUSE, NEW YORK.

NON-SKID-CHAIN-FASTENING MEANS.

1,318,081. Specification of Letters Patent. Patented Oct. 7, 1919.

Application filed January 24, 1919. Serial No. 272,915.

*To all whom it may concern:*

Be it known that I, BERT F. HOSLEY, of Syracuse, in the county of Onondaga and State of New York, have invented a certain new and useful Non-Skid-Chain-Fastening Means, of which the following is a specification.

This invention has for its object the production of a non-skid chain fastening means for vehicle wheels, which is very simple in construction, highly efficient and durable in use and one from which the chain can be readily and quickly detached and the parts of the fastening means replaced on the spoke of the wheel, thereby avoiding the loss of said parts; and the invention consists of the novel features and constructions hereinafter set forth and claimed.

In describing this invention, reference is had to the accompanying drawings in which like characters designate corresponding parts in all of the views.

Figure 1:
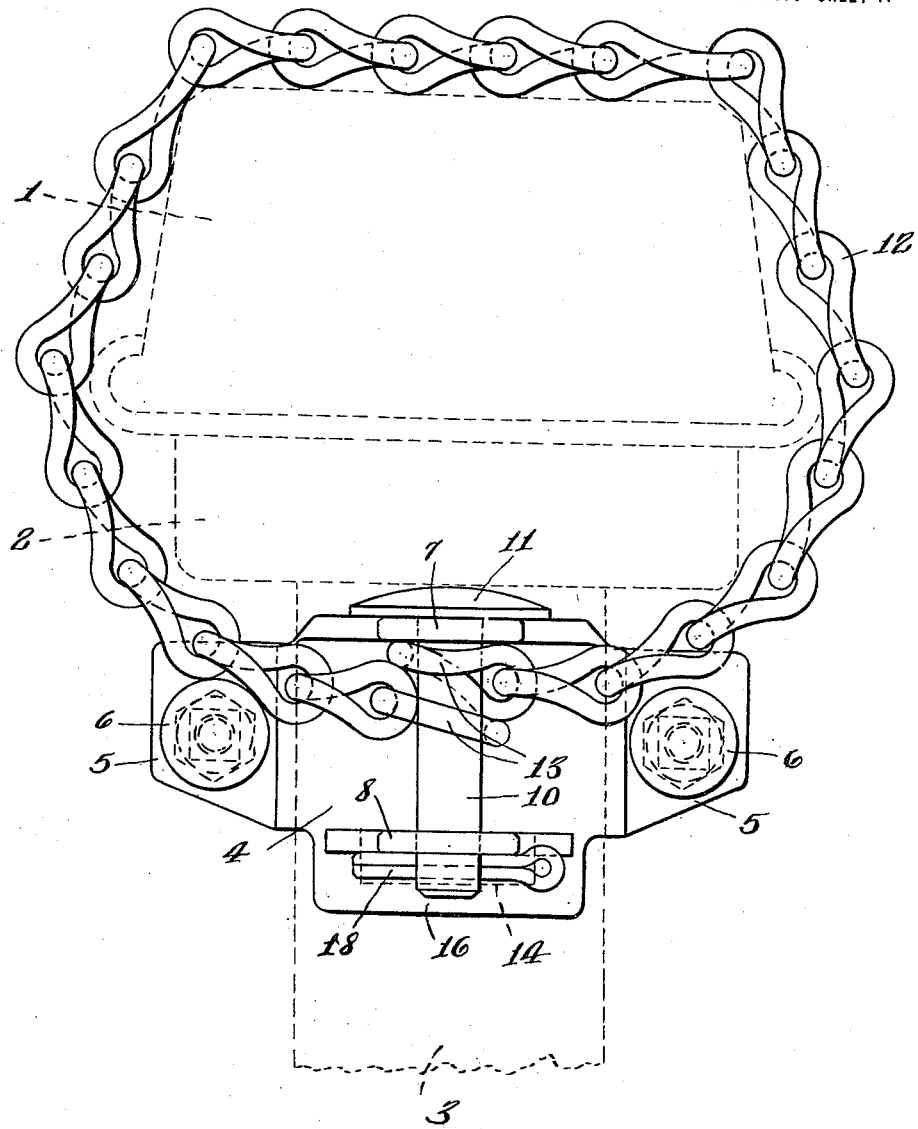
Figure 1 is a portion of a wheel shown in dotted lines with my chain fastening means shown in elevation thereon.
Figure 3:
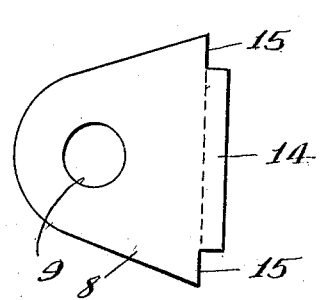
Figs. 3 and 4 are respectively a plan view and a side elevation of the removable ear.
Figure 4:
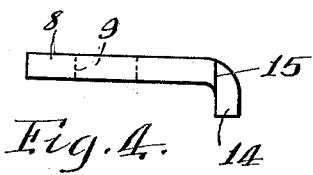
Figure 2:
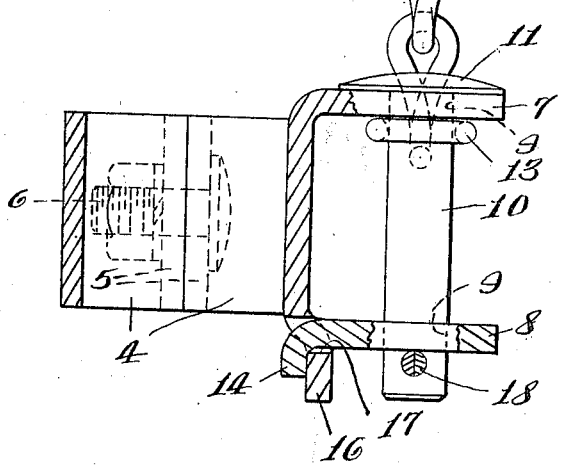
Fig. 2 is a side elevation, partly in section, and parts being removed of the device shown in Fig. 1.

This invention comprises generally a collar and means for fastening the same around a spoke of a wheel near the rim thereof, an ear extending from said collar adjacent said rim, a bolt passing through said ear with the head thereof between the rim and said ear, a chain loosely held around the tire of the wheel with the end links thereof held by said bolt, an additional ear interlocking with the collar and detachable therefrom and means for locking the same on the end of the bolt.

In the drawings, 1 is the tire, 2 the rim and 3 one of the spokes of a wheel. 4 is the collar which as here illustrated, is in two sections, each section being provided with ears 5, through which clamping means, as bolts 6 are passed for securing the same to the spoke 3.

The collar 4 is clamped to one of the spokes 3 of the wheel near the rim 2 thereof, and one of the sections of said collar is provided with spaced apart ears 7 and 8, one of said ears, as the ear 7, being formed integral therewith and the other ear 8 interlocking therewith and being removable therefrom. Each ear 7 and 8 is formed with an opening 9 through which a bolt 10 is passed.

As here illustrated the collar 4 is placed on the spoke with the ears 7 and 8 centrally alined with the center of the rim 2 and with the head 11 of the bolt held between the rim and the ear 7.

12 is the tire chain which is loosely held around the tire of the wheel with its end links 13 held by the bolt 10 between the ears 7 and 8.

The removable ear 8 is so constructed that it can be interlocked with the collar 4 and moved from inoperative position toward the ear 7 to an upright position over the end of the bolt 10, into operative position and locked in said operative position, and means is provided for preventing the ear from moving beyond its operative or upright position toward the ear 7.

As here shown, said ear 8 is provided with a tongue 14 projecting from the base thereof at an angle thereto and with bearing faces 15 on opposite ends of said tongue. The collar 4 is provided with an offset portion 16 having a slot 17 therein for receiving tongue 14 of the ear 8.

In operation, the collar 4 is clamped in position on one of the spokes with the head of the bolt 10 held between the ear 7 and the rim 2, the chain 12 is then placed around the tire with the end links 13 thereof placed over the bolt, the tongue 14 of the removable ear 8 is inserted in the slot 17 of the offset portion 16 of the collar and brought to an upright position over the end of the bolt 10 and securely held in said position by a key 18.

One of these devices may be placed on every spoke, if desired, or each section of the collar 4 may be provided with the ears 7 and 8, thereby permitting the use of two chains for each spoke.

Obviously, by the use of this holding means, the chains can be quickly and easily attached or detached and when the chain is detached the parts can be replaced without the possibility of said parts becoming loose and rattling, or being lost.

What I claim is:

1. A non-skid chain fastening means comprising a two-piece collar, and means for fastening the same around a spoke of a wheel near the rim thereof, spaced apart ears extending from said collar, one ear being removable, a chain loosely held around the tire of said wheel and means for holding the ends of the chain between the ears, substantially as and for the purpose specified.

2. A non-skid chain fastening means comprising a two-piece collar, and means for fastening the same around a spoke of a wheel near the rim thereof, an ear extending from said collar adjacent said rim, a bolt passing through said ear with the head thereof between the rim and said ear, a chain loosely held around the tire of the wheel with the end links thereof held by said bolt, an additional ear interlocking with the collar and detachable therefrom, and means for locking the same on the free end of the bolt, substantially as and for the purpose set forth.

3. A non-skid chain fastening means comprising a two-piece collar, and means for fastening the same around the spoke of a wheel, near the rim thereof, spaced apart ears extending from said collar, a chain loosely held around the tire of said wheel, a bolt passing through said ears and the end links of said chain for holding the end links between said ears, one of said ears interlocking with the collar and being movable from its locked position for removing the chain and means for holding said ear in its locking position, substantially as and for the purposes described.

In testimony whereof, I have hereunto signed my name in the presence of two attesting witnesses, at Syracuse, in the county of Onondaga, and State of New York, this 10th day of Jan., 1919.

BERT F. HOSLEY.

Witnesses:
CHAS. H. YOUNG,
G. B. PICKARD.

Copies of this patent may be obtained for five cents each, by addressing the "Commissioner of Patents, Washington, D. C."